(12) United States Patent
Kinder et al.

(10) Patent No.: US 7,944,922 B2
(45) Date of Patent: May 17, 2011

(54) MEDIA DISTRIBUTION IN A WIRELESS NETWORK

(75) Inventors: Richard D. Kinder, Eastwood (AU); Stuart Bryce, Crows Nest (AU); Adam J. Kent, Lilyfield (AU)

(73) Assignee: Altec Lansing Australia Pty Limited, Sydney (AU)

( * ) Notice: Subject to any disclaimer, the term of this patent is extended or adjusted under 35 U.S.C. 154(b) by 663 days.

(21) Appl. No.: 11/873,119

(22) Filed: Oct. 16, 2007

(65) Prior Publication Data

US 2008/0089268 A1    Apr. 17, 2008

Related U.S. Application Data

(60) Provisional application No. 60/829,723, filed on Oct. 17, 2006.

(51) Int. Cl.
*H04L 12/56* (2006.01)
(52) U.S. Cl. ........................................ 370/392; 714/748
(58) Field of Classification Search .......... 370/229–235, 370/389, 392; 714/746–749
See application file for complete search history.

(56) References Cited

U.S. PATENT DOCUMENTS

| | | | |
|---|---|---|---|
| 6,021,516 A * | 2/2000 | Okajima et al. | 714/748 |
| 6,466,832 B1 | 10/2002 | Zuqert et al. | |
| 6,954,641 B2 | 10/2005 | McKenna et al. | |
| 2002/0027495 A1 * | 3/2002 | Darby et al. | 340/298 |
| 2004/0160928 A1 | 8/2004 | Perlman | |
| 2005/0086569 A1 * | 4/2005 | Hiddink et al. | 714/749 |
| 2005/0133764 A1 | 6/2005 | Joanicot et al. | |
| 2005/0141469 A1 | 6/2005 | Miller et al. | |
| 2005/0169193 A1 | 8/2005 | Black et al. | |
| 2005/0288805 A1 | 12/2005 | Moore et al. | |
| 2006/0041815 A1 * | 2/2006 | Haymond | 714/748 |
| 2006/0174116 A1 | 8/2006 | Balfanz et al. | |
| 2007/0192833 A1 | 8/2007 | Ho et al. | |

FOREIGN PATENT DOCUMENTS

| | | |
|---|---|---|
| EP | 1380918 | 1/2004 |
| GB | 2402302 | 8/2005 |

* cited by examiner

*Primary Examiner* — Ricky Ngo
*Assistant Examiner* — Pao Sinkantarakorn
(74) *Attorney, Agent, or Firm* — Tarolli, Sundheim, Covell & Tummino LLP (57) ABSTRACT

In a network environment such as a wireless packet network, a source node transmits a data stream, e.g., a stream of media packets to a plurality of sink nodes, including the source node transmitting a first data stream of unicast packets addressed to at least a first one of the sink nodes, while other ones of said sink nodes receive while in promiscuous mode traffic on the network including the data stream. Individual ones of the other sink nodes, upon ascertaining that there are packets of the stream that were not received, transmit a re-transmission request to the source node so that the source node can take corrective action, and so all the sink nodes can receive the data stream, even though sent as unicast addressed to fewer than all the sink nodes.

17 Claims, 9 Drawing Sheets

MEDIA DISTRIBUTION IN A WIRELESS NETWORK

RELATED PATENT APPLICATIONS

The present invention claims priority of and is a conversion of U.S. Provisional Patent Application No. 60/829,723 filed Oct. 17, 2006 to inventors Kinder et al. The contents of such Application No. 60/829,723 are incorporated herein by reference.

This invention is related to concurrently filed U.S. patent application Ser. No. 11/872,931 titled UNIFICATION OF MULTIMEDIA DEVICES, to inventors Bryce et al. The contents of such application Ser. No. 11/872,931 are incorporated herein by reference.

This invention is also related to U.S. patent application Ser. No. 11/873,238 to inventors Bryce et al., titled CONFIGURING AND CONNECTING TO A MEDIA WIRELESS NETWORK, having and referred to herein as the "Connection Invention." The contents of such application Ser. No. 11/873,238 are incorporated herein by reference.

This invention is also related to U.S. patent application Ser. No. 11/559,360 filed Nov. 13, 2006 to inventors Celinski et al., titled MEDIA DATA SYNCHRONIZATION IN A WIRELESS NETWORK, and referred to herein as the "Synchronization Invention." The contents of such application Ser. No. 11/559,360 are incorporated herein by reference.

TECHNICAL FIELD

The present invention is related to transport of real-time data streams in a wireless packet network.

BACKGROUND

Transmitting and distributing real-time streaming data such as audio data in a wireless network and playing back the data in real-time, e.g., on a multimedia system that includes network connected loudspeakers, is becoming popular. Such real-time data is generated by a real-time source such as a source of digital audio and/or video data. In such a system, data from a real-time source may be fed into a wireless audio distribution network and played back in real-time on network connected loudspeakers.

For such real-time streaming, such traffic characteristics as throughput, maximum delay, delay and maximum jitter must all be accounted for and balanced in order for the multimedia system to operate correctly. When the multimedia system is running across a wireless network, the delay and jitter introduced due to the unreliable nature of the medium may become severe.

Consider for example a 5.1 surround sound audio system that includes wireless network links to at least some of the loudspeakers, with two front, two rear and one center channel loudspeakers, each having a corresponding wireless channel playback unit. Suppose that the surround sound audio system provides the audio for an audiovisual system, a so-called home theater system that includes video. Suppose further that a real-time source, e.g., a DVD player that provides digital audio output, e.g., in the S/PDIF format—also called IEC958 "Digital audio interface" standard format by the European Broadcasting Union (EBU)—is connected to one of the playback units, e.g., the center channel's playback unit. Suppose further that such a center channel is the source device for data, called a master device herein, and the other wireless loudspeaker subsystems are the recipients, that is, sink devices, called slave devices to the master device herein, and further suppose that the master device controls the multimedia stream to the slave devices. That is, the master device wirelessly distributes the audio to the other channels' playback units each acting as a slave device.

One method of distributing the media data across this kind of wireless network is to use multicast packets addressed to the slave devices. This presents an efficient means to deliver traffic to multiple devices; a single multicast packet is sent on the wireless network to all devices matching the multicast address specification rather than different unicast packets being sent to each individual slave device. Such a method is known to work well, for example, on a relatively reliable medium such as a wired Ethernet.

For wireless distribution, e.g., on a wireless local area network (WLAN), using a single multicast packet may have drawbacks. One possible drawback is that multicast packet delivery to the slave devices, e.g., acting as clients in the network with an access point in the wireless network, is relatively unreliable because multicast transmission does not include an acknowledgement from receiving entities, e.g., the receiving slave devices sending an acknowledgement (an "ACK").

Furthermore, in an infrastructure WLAN that includes an access point (AP), multicast packets can be delayed significantly by the AP when there are client devices that have power save mode. As is known, in an IEEE 802.11 WLAN, an AP stores multicast and broadcast traffic and delivers such traffic only at particular times after what are called DTIM beacon frames are transmitted by the access point.

Furthermore, multicast packets are typically transmitted at the lowest basic rate of the wireless network, which, in the case of a mixed mode IEEE 802.11b/g network, can be as low as 1 Mbps. This can cause medium saturation even for low bitrate applications. Furthermore, this means significant bandwidth is used for the transmission at such a low rate.

Consequently, multimedia systems running across wireless networks must either not use multicast packets, or must implement higher-layer link reliability mechanisms.

An alternate is to include the master device transmitting unicast packets to each slave device. This has the disadvantage that excessive network bandwidth may need to be consumed. For example, in the example of a 5.1 surround sound system with one master device and four slave devices, four times the amount of traffic would need to be transmitted across the network than in the multicast situation.

Yet another alternate includes using higher-layer retransmission schemes coupled with multicast traffic. This might have the disadvantage of introducing relatively large delays, e.g., in worst-case situations. This further might cause network traffic storms in the case that the wireless medium is disrupted by external interference, so that one or more of the slave devices do not correctly receive a given packet or packet(s).

Thus there is need in the art for methods and systems that combine one or more advantages of multicast transmission, e.g., efficiency, with one or more advantages of unicast transmission e.g., reliability, thus, for example, providing for a balance between network bandwidth usage and transmission reliability.

SUMMARY

Embodiments include a method in a source node of a packet network e.g., a wireless network, a method in a sink node of a packet network, and software that when executed by a processor implements a method in a source node, software that when executed by a processor implements a method in a sink node.

According to one or more aspects, a source node in a network environment such as a wireless packet network transmits a data stream, e.g., a stream of media packets to a plurality of sink nodes, including the source node transmitting a first data stream of unicast packets addressed to at least a first one of the sink nodes, while other ones of said sink nodes receive in promiscuous mode traffic on the network including the data stream. Individual ones of the other sink nodes, upon ascertaining that there are packets of the stream that were not received, transmit a re-transmission request to the source node so that the source node can take corrective action, and so that all the sink nodes can receive the data stream, even though the data stream was sent as unicast packets addressed to fewer than all the sink nodes.

One embodiment includes a method of transmitting a media data stream from a source node of a packet network, e.g., a master node in a wireless network to a plurality sink nodes of the network, e.g., the slave nodes in the wireless network. The method includes the source node transmitting a first stream of unicast packets addressed to at least one of the sink nodes, such that the addressee sink nodes can reliably receive the first stream while the other non-addressee sink nodes operate in promiscuous mode in which each can receive all traffic on the network including the first stream. The method further includes the source node receiving a re-transmission request packet from a particular non-addressee sink node with an indication that the particular non-addressee sink node has not successfully received one or more particular packets of the first stream; and the source node taking action to ensure that the particular non-addressee sink node receives the one or more particular packets, such that all sink nodes can receive the complete first stream.

One embodiment includes a carrier medium carrying one or more computer-readable instructions that when executed by at least one processor in a source node of a packet network, e.g., a master node in a wireless network that also includes a plurality of sink nodes, e.g., the slave nodes in the wireless network, implement a method of transmitting of a media data stream from the source node to the sink nodes of the network. The method includes the source node transmitting a first stream of unicast packets addressed to at least one of the sink nodes, such that the addressee sink nodes can reliably receive the first stream while the other non-addressee sink nodes operate in promiscuous mode in which each can receive all traffic on the network including the first stream. The method further includes the source node receiving a re-transmission request packet from a particular non-addressee sink node with an indication that the particular non-addressee sink node has not successfully received one or more particular packets of the first stream; and the source node taking action to ensure that the particular non-addressee sink node receives the one or more particular packets, such that all sink nodes can receive the complete first stream.

One embodiment includes a method in a packet network, e.g., a wireless network that includes a source node and a plurality of sink nodes. The method includes a particular sink node of the network operating in promiscuous mode including receiving traffic in the network. The traffic includes a first data stream of unicast packets, e.g., media data packets transmitted by the source node and addressed to at least another one of the sink nodes not including the particular sink node. The method further includes the particular sink node selecting the first data stream from the traffic received, the particular sink node ascertaining whether the particular non-addressee sink node has successfully received all packets of the first stream, and in the case the particular sink node has ascertained that the particular non-addressee sink node has not successfully received one or more particular packets, transmitting a re-transmission request packet to the source node with an indication that the particular non-addressee sink node has not successfully received the one or more particular packets of the first stream, such that the source node can take action to ensure that the particular non-addressee sink node receives the one or more particular not-received packets.

One embodiment includes a carrier medium carrying one or more computer-readable instructions that when executed by at least one processor in a particular sink node of a packet network, e.g., a master node in a wireless network that includes a source node and a plurality of sink nodes, e.g., slave nodes in the wireless network, implement a method. The method includes the particular sink node of the network operating in promiscuous mode including receiving traffic in the network, the traffic including a first data stream of unicast packets transmitted by the source node and addressed to at least another one of the sink nodes not including the particular sink node. The method further includes the particular sink node selecting the first data stream from the traffic received, the particular sink node ascertaining whether the particular non-addressee sink node has successfully received all packets of the first stream, and in the case the particular sink node has ascertained that the particular non-addressee sink node has not successfully received one or more particular packets, transmitting a re-transmission request packet to the source node with an indication that the particular non-addressee sink node has not successfully received the one or more particular packets of the first stream, such that the source node can take action to ensure that the particular non-addressee sink node receives the one or more particular not-received packets.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DESCRIPTION OF EXAMPLE EMBODIMENTS

Embodiments of the invention includes a method, a carrier medium carrying software that causes at least one processor to implement the method, and a system that uses unicast packet streams between a source device-called a master device and one or more sink devices, called slave devices, each an intended recipient of a respective unicast stream, and further one or more other sink devices (called slave devices), that are not the intended recipients of any of the unicast streams. Each slave device that is also an intended recipient of a unicast stream is called a slave-master device herein, and each slave device that is not an intended recipient of any unicast stream is called a slave-slave device herein.

Figure 1:
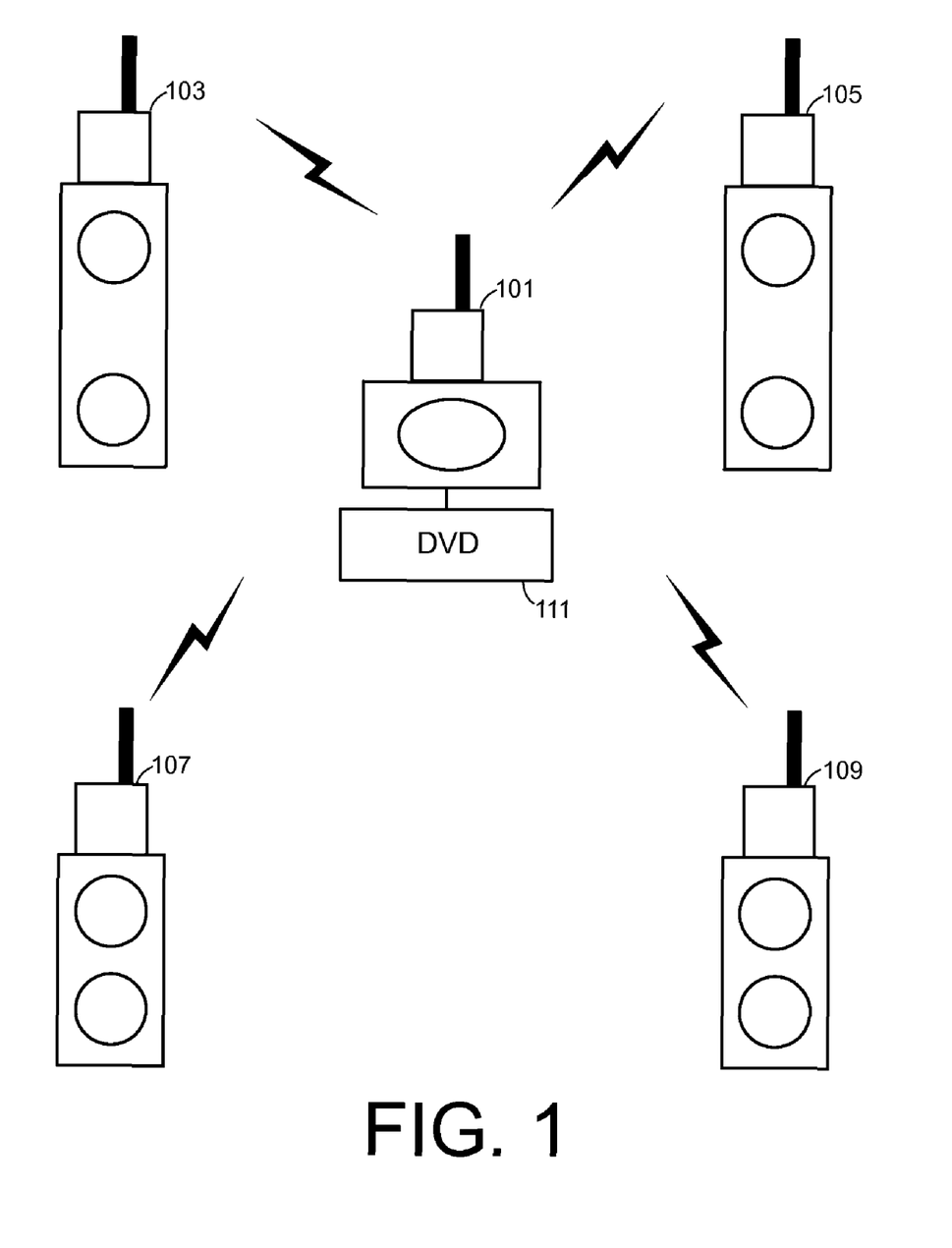
FIG. 1 shows a simple block diagram of an example infrastructure network for media stream playback that includes one or more embodiments of the present invention.

FIG. 1 shows an example wireless sound audio system that includes wireless network links to a plurality of wireless loudspeaker subsystems. The example shown is a 5.1 surround sound system including a left front wireless loudspeaker subsystem 103, a right front wireless loudspeaker subsystem 105, a center front wireless loudspeaker subsystem 101, a left rear wireless loudspeaker subsystem 107, and a right rear wireless loudspeaker subsystem 109. FIG. 1 for example describes the audio part of a so-called home theater system that includes video, and the wireless loudspeaker subsystems 101, 103, 105, 107, and 109 that wirelessly receive audio of audiovisual content. In one embodiment, a real-time source of digital media, e.g., a DVD player 111 provides S/PDIF audio output, and is connected to the center channel wireless loudspeaker subsystem 101 in this wireless home theater system. The appropriate audio data needs to be wirelessly transmitted by the center channel wireless loudspeaker subsystem to the respective other wireless loudspeaker subsystems 103, 105, 107, and 109, decoded and played back within a suitable short period of time so that a listener does not notice a delay, the lip-sync delay, between the video being watched and the audio being heard.

In one embodiment, the wireless network is an IEEE 802.11 standard wireless network. One device is elected to be the main data source in the private network. Such a device is called a master device herein. In one embodiment, the master device also functions as an access point of an infrastructure network. In an alternate embodiment, a separate access point is included. In the remainder of the description, unless explicitly stated otherwise, the access point of the private network is co-located, e.g., in the master device. In one embodiment, the master device that also acts as the access point is pre-selected, e.g., the center channel loudspeaker subsystem 101. Thus, the access point of the private network acts as a bridge between the S/PDIF input to the system from the DVD source 111 and the other loudspeaker subsystems via the wireless network. In one alternate embodiment, the source of real-time audio or AV content is from another network. In an alternate embodiment, the master device is selected randomly at start-up.

One specific embodiment includes the wireless loudspeaker subsystems playing back audio that is streamed from S/PDIF format output of a source device, such as a DVD player. The center channel wireless loudspeaker subsystem 101 is elected or pre-selected to run as an access point, and to run as a master device to serve data to the other wireless loudspeaker subsystems 103, 105, 107, 109.

One embodiment of the invention is a transmission method, implemented with 802.11 compliant devices, that uses unicast packet streams between a master device, e.g., center channel wireless loudspeaker subsystem 101 and one or more slave devices ("slave-master" devices), with other slave devices that are not the intended recipients of the unicast streams ("slave-slave" devices) receiving and examining all network traffic, called "promiscuously" receiving network traffic. The slave-slave devices receive multimedia data in this way. One embodiment further includes a higher-layer re-transmission method to ensure that if any slave-slave device does not receive a packet correctly, the slave-slave device can request a re-transmission of the "lost" packet as unicast data to the slave-slave device.

Figure 2:
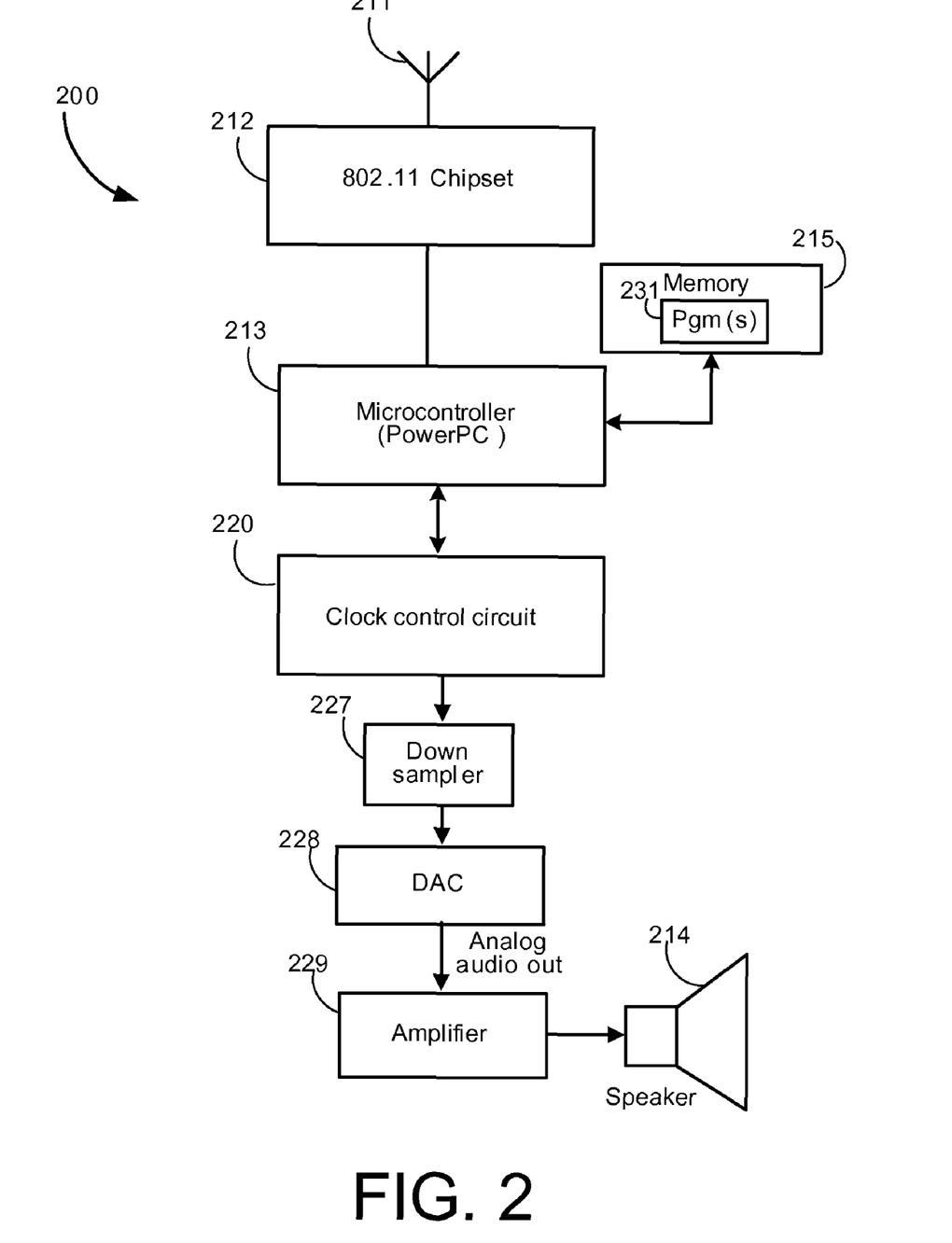
FIG. 2 shown a simple block diagram of a wireless loudspeaker subsystem that includes software that when executed carry out one or more method embodiments of the present invention.

FIG. 2 shown a simple block diagram of a wireless loudspeaker subsystem 200 that includes a wireless interface that includes an antenna subsystem 211, which is connected to a wireless network transceiver unit 212 that implements a wireless station, e.g., one conforming to the IEEE 802.11 wireless network standard. In one embodiment, transceiver 212 includes a standard commercial IEEE 802.11 chipset, e.g., one made by Atheros Communications, Inc. The wireless transceiver unit 212 is coupled to a microcontroller 213 that in one embodiment is a DSP device and that runs programs on the wireless loudspeaker subsystem 200. In one embodiment, the microcontroller 213 is arranged to run programs under an operating system, e.g., a Linux operating system, and includes a PowerPC core. The operating system and other programs 231, including programs that implement one or more of the method embodiments of the invention, can be stored in a memory 215. Although such details are not shown in FIG. 2, in order not to obscure the inventive aspects, those in the art will understand that some of the signal wires of microcontroller 213, of memory 215, and of wireless transceiver 212 are coupled to each other via a bus subsystem.

The playback unit 200 is arranged to receive audio streams that are then converted ("rendered") by the microcontroller 213 and other components to a form a set of digital samples for output. These can conform to the standard I2S format, or in any other form.

The digital audio samples are for forwarding via a clock control circuit 220 to a digital-to-analog converter (DAC) 228 via a downsampler 227 for analog conversion before output via an audio amplifier 229 to at least one loudspeaker 214.

Figure 3:
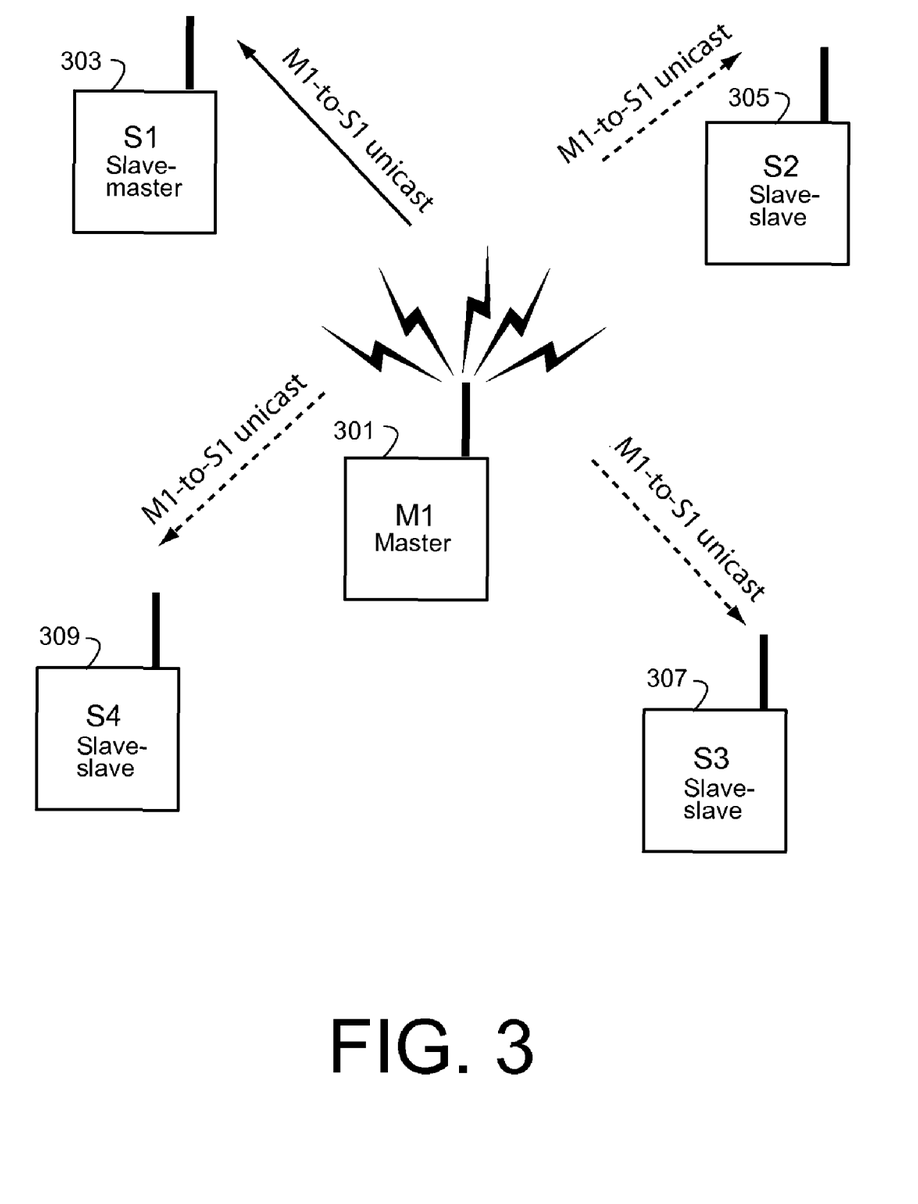
FIG. 3 shows a simple example system which includes a single master device M1 in a wireless network with a first, second, third and fourth slave device.

FIG. 3 shows a simple example system that includes a single master device 301 shown as M1, which can be, for example, the center channel loudspeaker subsystem 101 of FIG. 1, wirelessly coupled with a first, a second, a third and a fourth slave device 303, 305, 307, and 309, respectively, shown as S1, S2, S3, and S4 respectively. The master device 301 receives the audio data, e.g., in S/PDIF format, e.g., from a source device 111, and packetizes the data, including marking each packet with a unique, monotonically increasing sequence number. The master device 301 sources a media stream to the slave devices 303, 305, 307, and 309 of FIG. 3. In one example, the data is streamed using a unicast packet stream addressed to one of the slave devices—in this example to the first slave device 303, so S1303 is a slave-master device. The data is received in the other slave devices 305, 307, and 309 by each of the second, third, and fourth slave devices 305, 307, and 309—slave-slave devices in this example—operating in so-called promiscuous mode in which each slave-slave device receives and examines all packets on the wireless medium, including the unicast packets addressed to the slave-master device 303. In one embodiment, each slave-slave device, 305 and 307, is configured to select the unicast M1-to-S1 packets and to pass such selected packets to a playback application running on the respective device to render the audio or video data, e.g., to the device's loudspeaker.

While the transmission to the first slave device—the slave-master device 303—is reliable, there may be lost packets in one or more of the slave-slave devices 305, 307, and 309. Each slave-slave device includes software, e.g., software operating at the application layer that deals with packets that are lost, e.g., packets that have missing sequence numbers. In the case a sequence number of a sequence of packets is ascertained to be missing at a particular slave-slave device, the particular slave-slave device wirelessly sends a message to the master device M1 301, with a request for the packet or packets having missing sequence number(s) to be re-transmitted. The master device 301 receives a re-transmission request from the particular slave-slave device, and sends the missing packets according to the missing sequence number(s) in the re-transmission request. The sending of the missing packet(s) is by unicast packet(s) addressed to the requesting particular slave-slave device.

Figure 9:
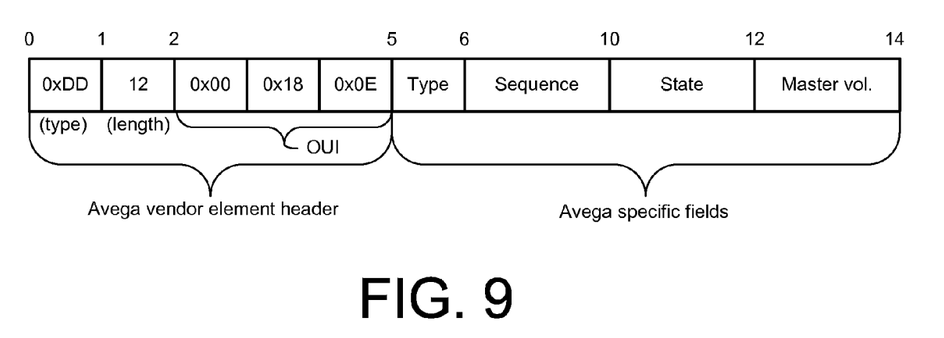
FIG. 9 shows a depiction of an information element used on one embodiment of the invention.

In one embodiment in which the wireless coupling conforms to the IEEE 802.11 standard, a method is included of detecting missing packet sequence numbers. The missing packet detection method uses beacon frames that include additional information, in one embodiment in the form of a vendor-specific information element (IE). Recall that beacon frames are broadcast from time to time, e.g., periodically from a access point. The IEEE 802.11 beacon format provides for vendor-specific extensions in the form of vendor specific IEs. FIG. 9 shows one embodiment of an IE used in one embodiment of the present invention. The sequence number field in the information element contains the last transmitted packet's sequence number of the unicast stream, and is updated from time to time, e.g., periodically on the master device, e.g., device 301 as the unicast stream packets are transmitted. The periodic beacon frame is sent at the lowest basic rate of the BSS, hence is more likely to be received by all listening clients. Thus, in cases where a slave-slave device temporarily suffers from localized interference, and cannot successfully receive the higher bit-rate slave-master packets promiscuously, it may still be able to successfully receive the beacon frames and determine that it is not receiving the unicast stream through comparison of the sequence number within the beacon frame and the last successfully received promiscuous unicast stream packet.

One skilled in the art will understand that the periodic update of the beacon frame information element can be extended to include other media and stream state information, thus preventing the system from potentially losing important control commands that may be embedded within the unicast media stream. One embodiment of the invention uses the information element to provide master volume levels and current media playback state to all of the slave devices, as shown in FIG. 9.

Figure 4:
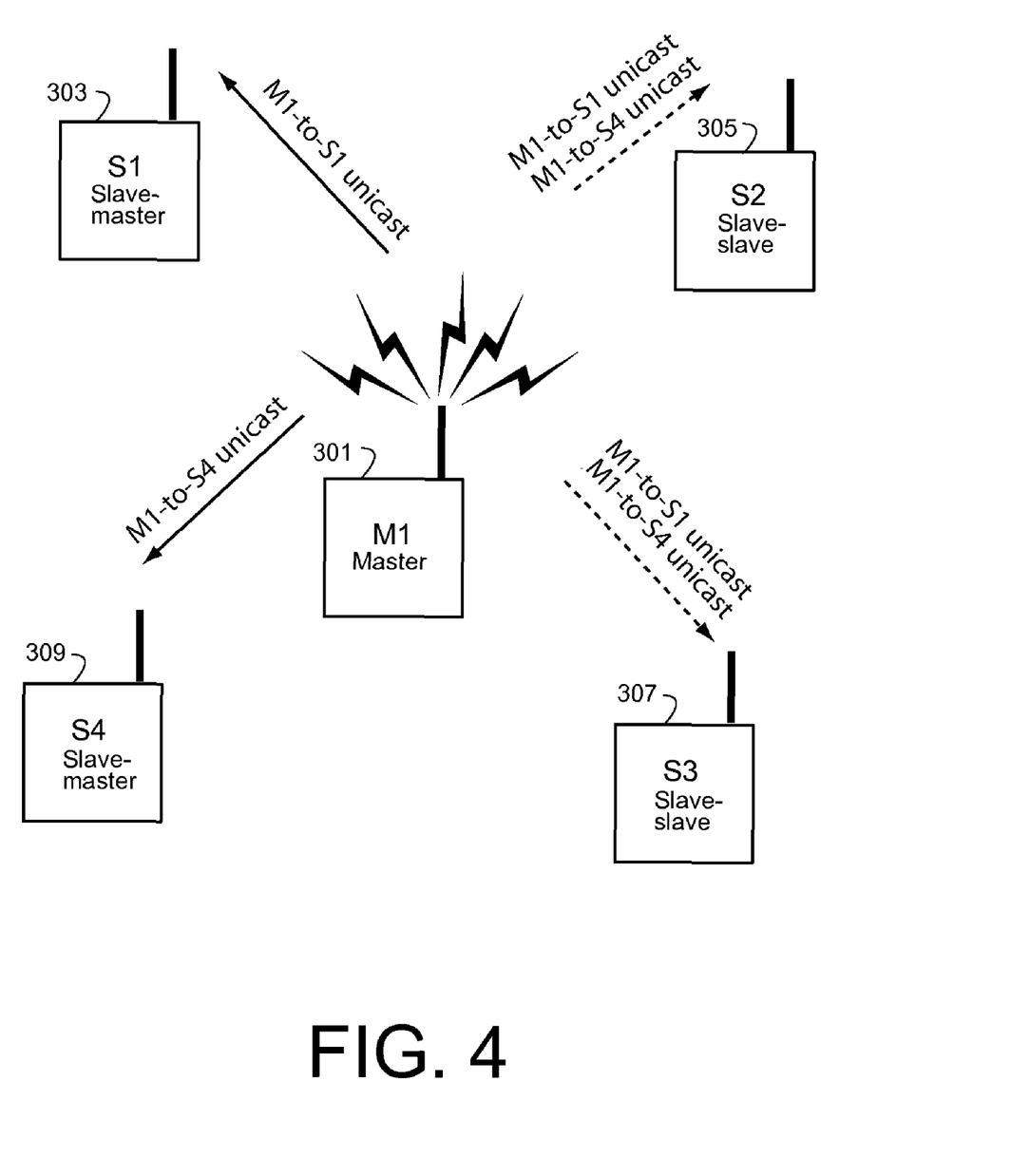
FIG. 4 shows a simple example system with two slave-master devices S1 and S4 and a master device M1 that sources data.

In another embodiment, there is a single master, more than one slave-master devices, and one or more slave-slave devices. FIG. 4 shows one example system with two slave-master devices, S1 303 and S4 309. The master device is again M1 301, and there are two slave-slave devices 305, 307. As in the example of FIG. 3, each slave-slave device 305, 307 receives all traffic in promiscuous mode, including the M1-to-S1 unicast packets and the M1-to-S4 unicast packets. In the case that a sequence number of a sequence of packets is ascertained to be missing at a particular slave-slave device, the particular slave-slave device wirelessly sends a message to the master device, with a request for the packet or packets having missing sequence number(s) to be re-transmitted. The master device receives a re-transmission request from the particular slave-slave device, and sends the missing packets according to the missing sequence number(s) in the re-transmission request. The sending of the missing packet(s) is by unicast packet(s) addressed to the requesting particular slave-slave device.

In the case of more than one slave-master device, because each slave-slave device now can receive more than one unicast stream, the probability that each packet in the sequence will be received is higher than if there is only one unicast stream which the slave-slave devices can receive. Thus, communication to all slave devices will be more reliable than the case of there being only a single slave-master device.

Thus one in the art can appreciate that there is a tradeoff possible between network throughput and traffic reliability by having more or fewer slave-master devices. Assuming the same data rate for all unicast transmissions, the highest reliability corresponding to the lowest throughput, is the case of unicasting to each of the slave devices, so that no slave devices receive the data only while in promiscuous mode, while the highest throughout, corresponding to the lowest reliability spectrum is the case of the master unicasting to a single slave device, with all the other slave-slave device(s) receiving the data while in promiscuous mode.

Thus has been described a method of reliable transmission to all slave devices achieved by sending unicast packets to one or more slave-master devices, while one or more slave-slave devices receive traffic in promiscuous mode. Thus, reliability is achieved, but the bandwidth requirement is reduced compared to sending unicast to each of the slave devices.

These example embodiments of the invention are by no means the only possible variations, and one skilled in the art would understand there are a multitude of different setups and schemes that are encapsulated by this invention.

Returning to FIG. 3 to the case of a single slave-master device, e.g., S1 303. One alternate embodiment includes the master device 301 monitoring the error rate of each slave-slave device, e.g., as indicated by the rates of receiving re-transmission from each slave-slave device, and detecting if the error rate from a particular slave-slave device becomes relatively high, as indicated by an error rate exceeding a pre-defined error threshold, indicated by the rate of receipt of re-transmission requests exceeding a pre-defined threshold. In one embodiment the pre-defined threshold is settable by the user. Suppose, for example, that a particular slave-slave device, say S3 307, sends re-transmission requests relatively frequently, and that these are received by the master device. This might indicate that the particular slave-slave device 307 cannot reliably receive the M1-to-S1 unicast traffic. In one embodiment, the master device 301 re-addresses the unicast stream previously addressed to the first slave S1 303 to the frequently-requesting slave S3 307, that now becomes the slave-master device. Using standard transport mechanisms, the new transmit rate of the unicast stream will be the highest transmit rate that the new unicast slave-master, now S3 307, can support. It is highly likely that the previous slave-master S1303, now a slave-slave, will be able to correctly receive the packets at this new rate, so that there should be fewer if any re-transmission requests from the now slave-slave device 303 than there were from the previous slave-slave, now slave-master device 307.

Figure 5:
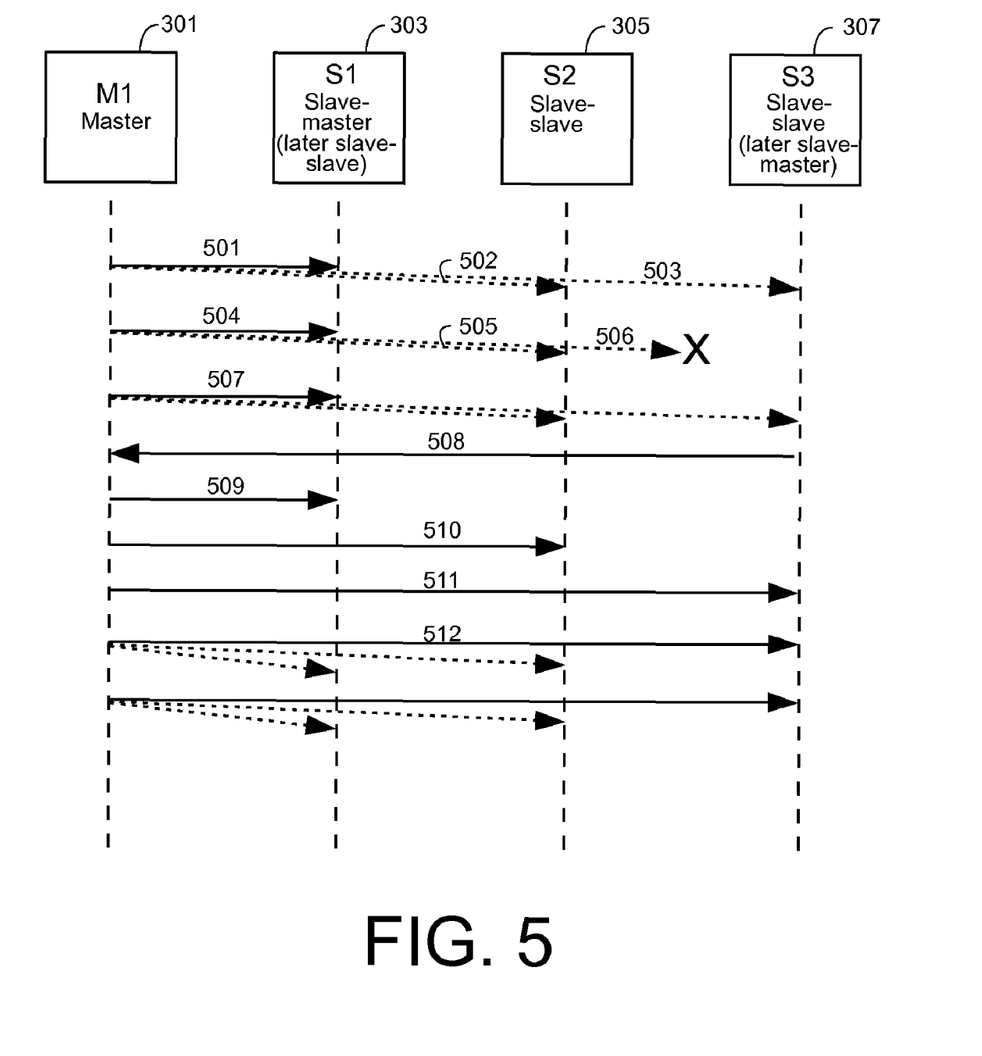
FIG. 5 shows an example packet exchange to illustrate some of the inventive aspects of the invention.

FIG. 5 shows an example packet exchange to illustrate some of the inventive aspects of the invention. FIG. 5 shows a single master device (M1) 301 and three slave devices (S1, S2, S3) 303, 305, and 307. The first slave S1303 is the slave-master, i.e., the addressee of the unicast frames from the master device 301, while the other slave devices 305 and 307 are slave-slaves that are arranged in operation to receive network traffic in promiscuous mode.

The master device 301 sends a M1-to-S1 unicast data packet 501. This is wirelessly received and examined by the slave-slave devices 305 and 307 in promiscuous mode, as shown by messages 502 and 503. In this drawing, dotted line arrows are used to show messages that are received or receivable by the slave-slave devices, but addressed to the slave-master device.

In this example, master device 301 sends the next M1-to-S1 unicast data packet 504, which is successfully received by the slave-master device 303, and also by the second slave device 305 in promiscuous mode (the receipt shown as 505), but not received by the third slave device S3 307, as shown by the broken arrow 506 and the X.

Master device 301 sends the next M1-to-S1 unicast data packet 507, which is successfully received by the slave-master device 303, and also by the second and third slave devices 305, 307. At this point, the third slave device S3 307 realizes it has missed a packet.

S3 307 sends a re-transmit request (508) to the master device M1 301, indicating it has dropped a packet, the re-transmit request indicating the missing packet number. M1 can take several actions at this point. In one embodiment, the master device in response can send the missing packet as a unicast transmission addressed to the requesting slave-slave device S3 307.

In the example of FIG. 5, suppose that the master has stored a history of which slave-slave device has made re-transmissions, and, based for example on some history of the third slave device S3 307 previously missing packets, the master device 301 decides to switch from sending unicast packets addressed to S1 303 to sending unicast packets addressed to S3 307. In one embodiment, as a result of the decision to switch the addressee of unicast packets, the master device sends messages addressed to each slave device including the addressee of the new slave-master device so that the non slave-master devices, now devices 303 and 305, can switch to promiscuous mode, and also to select messages addressed from the master device to the new slave-master device 307.

In messages 509, 510, and 511, the master informs the slave devices 303, 305, and 307, respectively of the new topology such that after receipt of these messages, S3 307 is the slave-master device.

The message 512 is the first M1-to-S3 unicast packet from the master device 301. This message is promiscuously receivable and examinable by the other two slave devices, S1303 and S2 305 that are now slave-slave devices.

In FIG. 5 messages 501-503 and message 512 are unicast data stream packets. Each of messages 508-511 are control packets. Two types of control messages are introduced: the first is a re-transmission message that includes, in one embodiment in a first new information element (IE): a stream identifier, sequence number(s) of the missing packet number(s) of the stream, the MAC address of the requesting device, and, in one embodiment in which the data is for multi-channel audio playback, which channel the particular slave device plays back. The second message is a slave-master switch message transmitted to each slave device to indicate a new slave master device. The slave-master switch message includes, in one embodiment in a second new information element (IE): a stream identifier, the starting sequence number(s) of the stream that is to be addressed to the new slave-master device, and the address of the new slave master device.

In an alternate embodiment, the master device reduces the transmit rate to the slave, S1, thus raising the probability that the other slaves will successfully receive the packet while operating (receiving) in promiscuous mode.

Note that while one embodiment includes application layer software instructions that cause the processor in a slave device to carry packet selecting, the ascertaining of missing packets, and the re-transmission requests, and the receiving of missing packets transmitted by the master device receiving the re-transmission request, in another embodiment, the software instructions are part of a lower-layer in the network interface stack of the device. Similarly, while one embodiment includes application layer software instructions that cause the processor in a master device to receive and interpret re-transmission requests, to send out re-transmissions, and in some embodiments, to decide to switch the slave master and send out control packets to the slave devices to indicate the change of the slave-master device, in another embodiment, the software instructions are part of a lower-layer in the network interface stack of the device.

Again, one skilled in the art will appreciate that these modifications and extensions are not the only applications of this invention. There are many other modifications that fall under the umbrella of this invention.

Another aspect of this invention is key exchange to ensure security and to ensure that the slave-slave and slave-master devices can securely receive the unicast packets to the slave-master device. Suppose for example, that an EAP authentication method, WPA2, or any of the IEEE 802.11i or WPA variants is used for authenticating the slave devices and master device to the network, one embodiment includes unicast key synchronization to ensure that all devices use the same unicast key for receiving unicast frames from the master device, whether the receiving is by the addressee of the unicast frames, i.e., a slave master device, or by the device receiving while in promiscuous mode. In one embodiment, unicast key synchronization is carried out using an EAP-key message as described, for example, in the IEEE 802.11i standard. In another embodiment, a custom message transmitted from the master to the slave-master and slave-slave devices initiates the key exchange.

Figure 6:
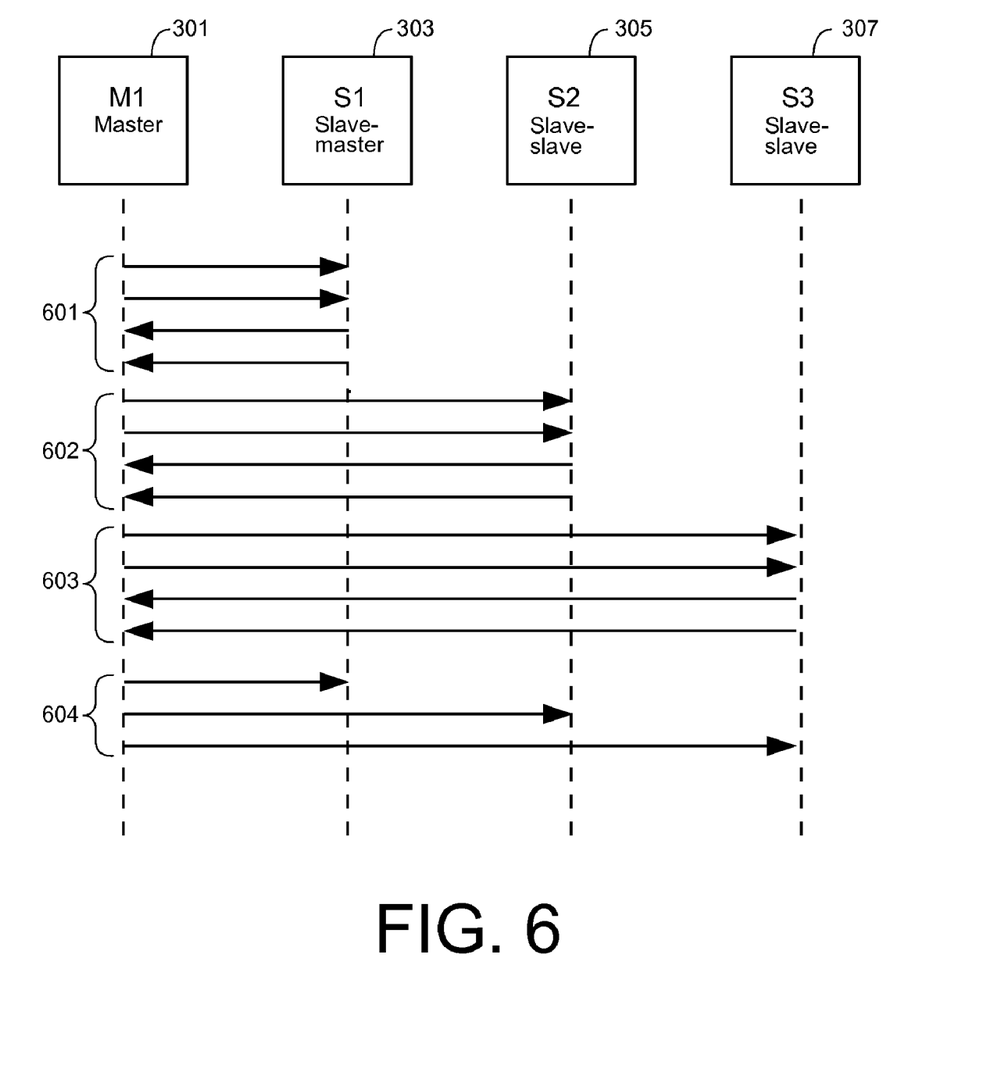
FIG. 6 illustrates one embodiment of message exchange for key synchronization.

FIG. 6 illustrates one embodiment of message exchange for key synchronization. FIG. 6 shows a single master device (M1) 301 and three slave devices (S1, S2, S3) 303, 305, and 307. The first slave S1 303 is the slave-master, i.e., the addressee of the unicast frames from the master device 301, while the other slave devices 305 and 307 are slave-slaves that are arranged in operation to receive network traffic in promiscuous mode.

In FIG. 6, message exchanges 601, 602 and 603 represent the 802.11 and/or higher level EAP authentications using 4-messages per key exchange. Message exchange 604 represents the synchronization of the transmit keys between all devices in the system. In this case, the contents of the message to each client is encapsulated within an EAP-key packet, encrypted as per normal traffic across the network. After message exchange sequence 604 completes, all the devices in the network will be operating with the same unicast network key.

Figure 7:
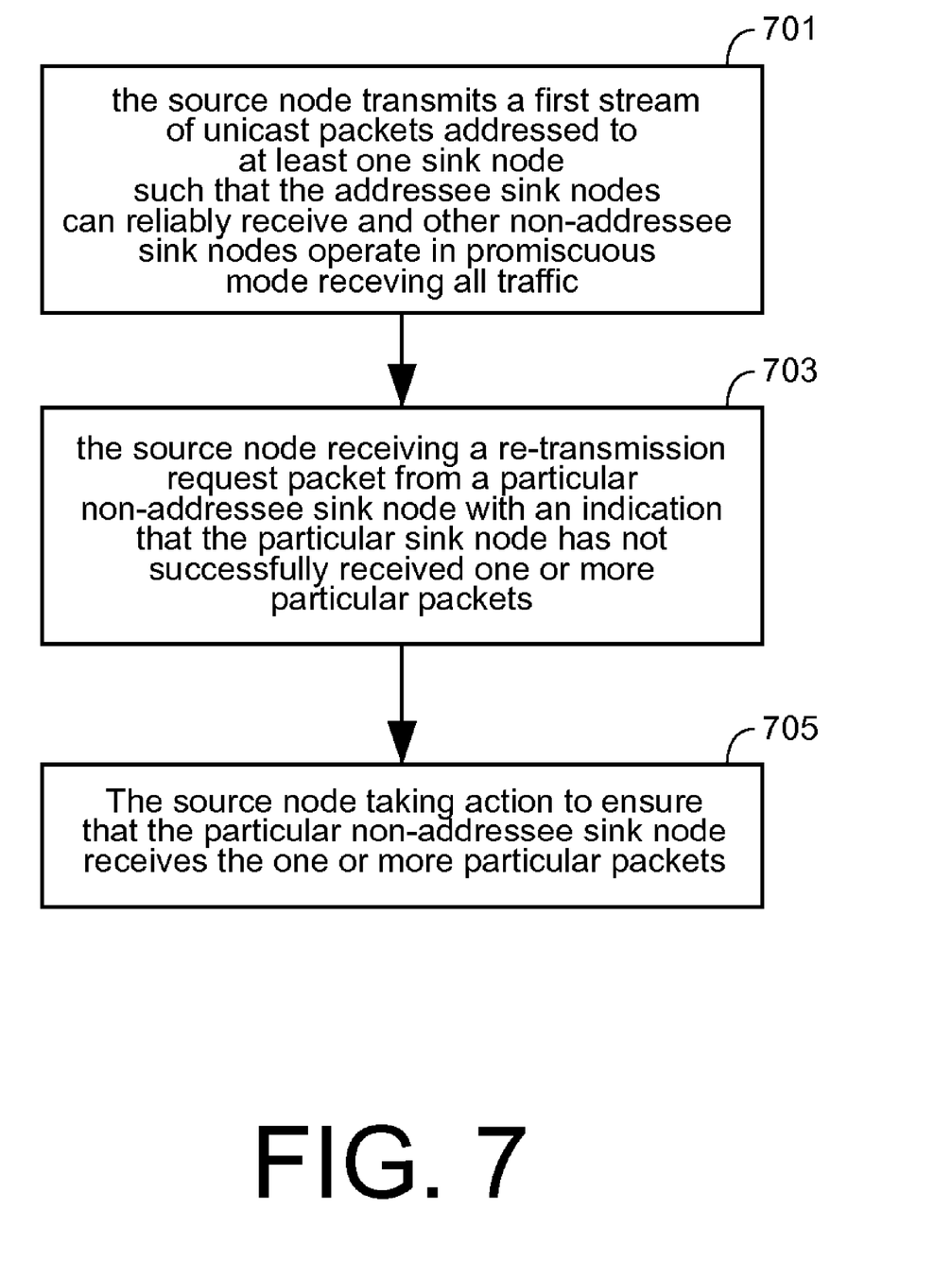
FIG. 7 shows a simple flowchart of a method in the master device.

FIG. 7 shows a simple flowchart of a method in the master device. The method is of transmitting of a media data stream from a source node of a packet network, e.g., a master node in a wireless network to a plurality of sink nodes of the network, e.g., the slave nodes in the wireless network. The method includes in 701 the source node transmitting a first stream of unicast packets addressed to at least one of the sink nodes, such that the addressee sink nodes can reliably receive the first stream while the other non-addressee sink nodes operate in promiscuous mode in which each can receive all traffic on the network including the first stream. The method further includes in 703 the source node receiving a re-transmission request packet from a particular non-addressee sink node with an indication that the particular non-addressee sink node has not successfully received one or more particular packets of the first stream; and in 705 the source node taking action to ensure that the particular non-addressee sink node receives the one or more particular packets, such that all sink nodes can receive the complete first stream.

Figure 8:
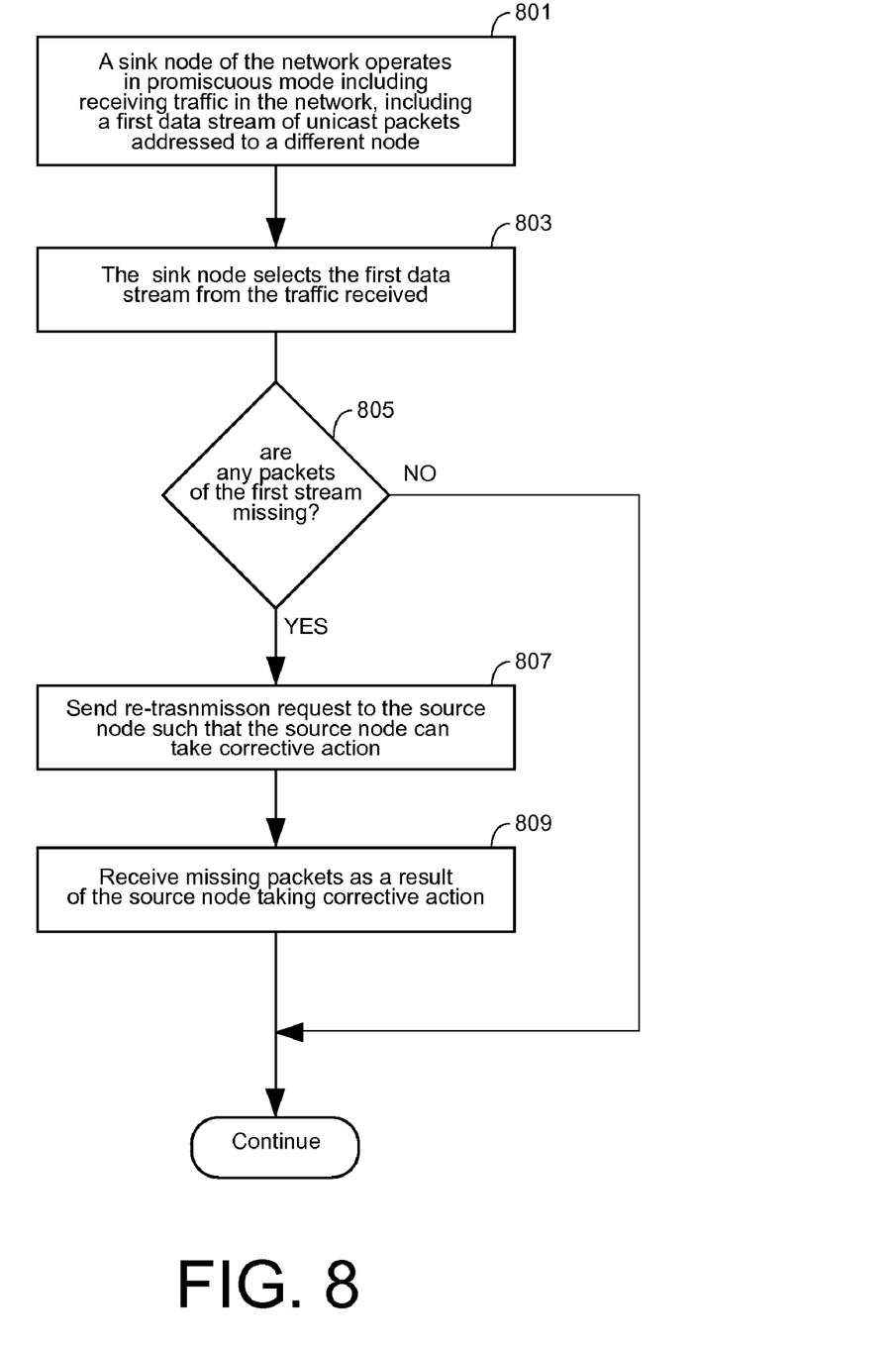
FIG. 8 shows a simple flowchart of a method embodiment in a slave-slave device.

FIG. 8 shows a simple flowchart of a method embodiment in a slave-slave device. The method is in a packet network, e.g., a wireless network that includes a source node and a plurality of sink nodes. The method includes in 801 a particular sink node of the network operating in promiscuous mode including receiving traffic in the network. The traffic includes a first data stream of unicast packets, e.g., media data packets transmitted by the source node and addressed to at least another one of the sink nodes not including the particular sink node. The method further includes in 803 the particular sink node selecting the first data stream from the traffic received, the particular sink node in 805 ascertaining whether the particular non-addressee sink node has failed to successfully receive any packets of the first stream, and, in 807, in the case that the particular sink node has ascertained that the particular non-addressee sink node has not successfully received one or more particular packets, transmitting a re-transmission request packet to the source node with an indication that the particular non-addressee sink node has not successfully received the one or more particular packets of the first stream, such that the source node can take action to ensure that the particular non-addressee sink node receives the one or more particular not-received packets. In 809, the missing packets are received as a result of the source node taking corrective action.

In keeping with common industry terminology, the terms "base station", "access point", and "AP" may be used interchangeably herein to describe an electronic device that may communicate wirelessly (or more broadly though a medium such as power lines; see below) and substantially simultaneously with multiple other electronic devices, while the terms "client," "slave device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment for operation conforming to the IEEE 802.11 standard has been described, the invention may be embodied using devices conforming to other wireless network standards and for other applications, including, for example other WLAN standards and other wireless standards. Applications that can be accommodated include IEEE 802.11 wireless LANs and links, wireless Ethernet, HIPER-LAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes a source device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a wireless loudspeaker system for playback of audio. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of transmitting of a media data stream from a source node of a packet network to a plurality of sink nodes of the network, being a network wherein the source node and sink nodes communicate with one another wirelessly via a common access point, the method comprising:

the source node transmitting a first stream of unicast packets addressed to at least one of the sink nodes, and not addressed to the other non-addressee sink nodes, such that the addressee sink nodes are operative to reliably receive the first stream via the unicast transmission, while the other non-addressee sink nodes operate in promiscuous mode in which each can receive all traffic on the network including the first stream, wherein each of the other non-addressee sink nodes is configured to receive the first stream and determine whether one or more particular packets of the first stream have not been successfully received;

receiving a re-transmission request packet from a particular non-addressee sink node with an indication that the particular non-addressee sink node has not successfully received one or more particular packets of the first stream; and taking action to ensure that the particular non-addressee sink node receives the one or more particular packets, such that all sink nodes are operative to receive the complete first stream.

2. A method as claimed in claim 1, wherein the transmitting is by way of a wireless network, and wherein at least some of the sink nodes include a wireless loudspeaker subsystem for playback of audio.

3. A method as claimed in claim 1, wherein the first stream is sent by unicast packets addressed to more than one sink node.

4. A method as claimed in claim 1, wherein the first stream is sent by unicast packets addressed to one sink node, the other sink nodes being the non-addressee sink nodes.

5. A method as claimed in claim 1, wherein the taking of action includes the source node transmitting the one or more particular packets of the first stream as one or more unicast packets addressed to the particular sink node from which the re-transmission request packet was received.

6. A method as claimed in claim 1, further comprising monitoring the error rates of receipt by the non-addressee sink nodes and wherein the action includes, in the case that an error rate is ascertained to be more than a pre-defined threshold, switching the one or more addressee sink nodes to be those one or more sink nodes that have relatively high respective error rates of reception.

7. A method as claimed in claim 6, wherein the error rate for a non-addressee sink node is indicated by the rate of receipt of re-transmission requests from the particular non-addressee sink node.

8. A method as claimed in claim 1, wherein the taking of action includes the source node reducing the rate at which the first node transmits the first stream as unicast packets addressed to the at least one of the sink nodes.

9. A method as claimed in claim 1, further comprising prior to the transmitting of the first stream, assigning sequence indicators to the packets of the first stream so that a receiving node is operative to ascertain whether a packet has not been received, and further is operative to indicate in a re-transmission request the sequence indicator of a packet that have not been received.

10. A method in a packet network that includes a source node and a plurality of sink nodes, being a network wherein the source node and sink nodes communicate with one another wirelessly via a common access point, the method comprising:

a particular sink node of the network operating in promiscuous mode including receiving traffic on the network, the traffic including a first data stream of unicast packets sent by the source node and addressed to at least another one of the sink nodes not including the particular sink node;

the particular sink node selecting the first data stream from the traffic received;

the particular sink node ascertaining whether the particular non-addressee sink node has successfully received all packets of the first stream; and in the case that the particular sink node has ascertained that the particular non-addressee sink node has not successfully received one or more particular packets, transmitting a re-transmission request packet to the source node with an indication that the particular non-addressee sink node has not successfully received the one or more particular packets of the first stream, wherein the source node is operative to take action to ensure that the particular non-addressee sink node receives the one or more particular not-received packets.

11. A method as claimed in claim 10, wherein the transmitting is by way of a wireless network, and wherein the particular sink node includes a wireless loudspeaker subsystem for playback of audio.

12. A method as claimed in claim 10, wherein the first stream is sent by unicast packets addressed to more than one sink node.

13. A method as claimed in claim 10, wherein the first stream is sent by unicast packets addressed to one sink node.

14. A method as claimed in claim 10, further comprising receiving one or more unicast packets addressed to the particular sink node, the unicast packets addressed to the particular sink node being transmitted by the source node as a result of the source node taking action in response to receiving the re-transmission request packet.

15. A method as claimed in claim 10, further comprising receiving a packet from the source node indicating that the unicast packets of the first stream are to be packets addressed to a different sink node.

16. A non-transitory computer-readable carrier medium carrying a set of instructions that when executed by one or more processors in a source node of a packet network, being a network wherein the source node and sink nodes communicate with one another wirelessly via a common access point, cause the one or more processors to carry out a method of transmitting of a media data stream from the source node to a plurality of sink nodes of the network, the method comprising:

the source node transmitting a first stream of unicast packets addressed to at least one of the sink nodes, and not addressed to the other non-addressee sink nodes, such that the addressee sink nodes are operative to reliably receive the first stream while the other non-addressee sink nodes operate in promiscuous mode in which each can receive all traffic on the network including the first stream, wherein each of the other non-addressee sink nodes is configured to receive the first stream and determine whether one or more particular packets of the first stream have not been successfully received;

receiving a re-transmission request packet from a particular non-addressee sink node with an indication that the particular non-addressee sink node has not successfully received one or more particular packets of the first stream; and taking action to ensure that the particular non-addressee sink node receives the one or more particular packets, such that all sink nodes are operative to receive the complete first stream.

17. A non-transitory computer-readable carrier medium carrying a set of instructions that when executed by one or more processors in a particular sink node of a packet network comprising a source node and a plurality of sink nodes, being a network wherein the source node and sink nodes communicate with one another wirelessly via a common access point, cause the one or more processors to carry out a method comprising:

a particular sink node in the source node operating in promiscuous mode including receiving traffic on the network, the traffic including a first data stream of unicast packets addressed to at least another one of the sink nodes not including the particular sink node;

the particular sink node selecting the first data stream from the traffic received;

the particular sink node ascertaining whether the particular non-addressee sink node has successfully received all packets of the first stream; and in the case that the particular sink node has ascertained that the particular non-addressee sink node has not successfully received one or more particular packets, transmitting a re-transmission request packet to the source node with an indication that the particular non-addressee sink node has not successfully received the one or more particular packets of the first stream, wherein the source node is operative to take action to ensure that the particular non-addressee sink node receives the one or more particular not-received packets.

* * * * *